United States Patent
Gupta et al.

(10) Patent No.: US 9,148,069 B2
(45) Date of Patent: Sep. 29, 2015

(54) HIGH VOLTAGE HIGH POWER MULTI-LEVEL DRIVE STRUCTURE

(75) Inventors: Ranjan Kumar Gupta, Schenectady, NY (US); Rajib Datta, Niskayuna, NY (US); Di Zhang, Albany, NY (US)

(73) Assignee: General Electric Company, Niskayuna, NY (US)

( * ) Notice: Subject to any disclaimer, the term of this patent is extended or adjusted under 35 U.S.C. 154(b) by 312 days.

(21) Appl. No.: 13/480,919

(22) Filed: May 25, 2012

(65) Prior Publication Data

US 2013/0314957 A1    Nov. 28, 2013

(51) Int. Cl.
*H02M 7/483* (2007.01)
*H02M 7/487* (2007.01)
*H02M 1/00* (2007.01)

(52) U.S. Cl.
CPC ............. *H02M 7/483* (2013.01); *H02M 7/487* (2013.01); *H02M 2001/007* (2013.01)

(58) Field of Classification Search
None
See application file for complete search history.

(56) References Cited

U.S. PATENT DOCUMENTS

| 6,058,031 | A | 5/2000 | Lyons |
| 6,101,109 | A | 8/2000 | Duba |
| 6,466,460 | B1 | 10/2002 | Rein |
| 7,050,311 | B2 * | 5/2006 | Lai et al. .................... 363/37 |
| 2006/0164050 | A1 | 7/2006 | Hasegawa et al. |
| 2006/0170371 | A1 | 8/2006 | Lyle, Jr. et al. |
| 2008/0084112 | A1 | 4/2008 | Kumar et al. |
| 2008/0291708 | A1 | 11/2008 | Teichmann et al. |
| 2010/0219692 | A1 | 9/2010 | Flury |
| 2010/0309698 | A1 | 12/2010 | Asplund et al. |
| 2011/0110136 | A1 | 5/2011 | Lacarnoy |
| 2012/0163057 | A1 * | 6/2012 | Permuy et al. ............ 363/131 |

FOREIGN PATENT DOCUMENTS

| JP | 2001016866 A | * | 1/2001 |
| JP | 2005137045 A | * | 5/2005 |

OTHER PUBLICATIONS

Steimer, P.K. et al., "Practical Medium Voltage Converter Topologies for High Power Applications", Industry Applications Conference, 2001. Thirty-Sixth IAS Annual Meeting. Conference Record of the 2001 IEEE, Issue Date: Sep. 30-Oct. 4, 2001, on pp. 1723-1730 vol. 3, Print ISBN: 0-7803-7114-3, Cited by: 6.

Barbosa, Peter, et al., "Active-Neutral-Point-Clamped (ANPC) Multilevel Converter Technology", Power Electronics and Applications, 2005 European Conference on Dresden, Germany, Sep. 11-14, 2005, pp. P1-P10, Sep. 11, 2005.

Banaei, M. R., et al., "A modified selective harmonic elimination switching strategy for Hybrid Flying Capacitor Multicell converter", Electrical and Electronics Engineering (ELECO), 2011 7th International Conference on, IEEE, pp. I-278-I-282, Dec. 1, 2011.

(Continued)

*Primary Examiner* — Timothy J Dole
*Assistant Examiner* — Monica Mata
(74) *Attorney, Agent, or Firm* — Andrew J. Caruso

(57) ABSTRACT

A high voltage, high power multi-level drive structure includes a plurality of neutral-point-piloted (NPP) converter cells stacked together. At least one clamping diode is connected to one or many NPP converter cells to provide a neutral-point-pilot-clamped (NPPC) converter structure. Flying capacitors connected to the NPPC converter structure yield a neutral-point-clamped-flying-capacitor converter cell structure.

18 Claims, 7 Drawing Sheets

(56) References Cited

OTHER PUBLICATIONS

Yuan, Xiaoming, et al., "ARCPI Resonant Snubber for the Neutral-Point-Clamped Inverter", IEEE Transactions on Industry Applications, vol. No. 36, Issue No. 2, pp. 586-595, Mar. 1, 2000.

PCT Search Report and Written Opinion dated Mar. 3, 2014 issued in connection with corresponding PCT Application No. PCT/US2013/042264.

* cited by examiner

US 9,148,069 B2

HIGH VOLTAGE HIGH POWER MULTI-LEVEL DRIVE STRUCTURE

BACKGROUND

The subject matter of this disclosure relates generally to high voltage, high power multi-level drive structures, with many input and output phases, and more particularly to a multi-level drive structure that combines the architectures of classical multi-level neutral-point-clamped (NPC) and multi-level neutral-point-piloted (NPP) converter topologies.

A multiplicity of multi-level drive structures have been proposed. One known multi-level drive structure is the classical three-level neutral-point-clamped converter 10 such as shown in FIG. 1. Another known multi-level drive structure is the three-level neutral-point-piloted converter 20 such as shown in FIG. 2. Although known NPC and NPP converter structures have proven to be advantageous in numerous applications, these known converter structures leave room for improvements in both operational efficiency and waveform quality.

Yet, another known multi-level drive structure 30 is illustrated in FIG. 3. Although the multi-level converter 30 structure shown in FIG. 3 offers improvements over the NPC and NPP converter structures, it still leaves room for improvements in operational efficiency as well as reliability.

Still another known multi-level drive structure is depicted in FIG. 4 that illustrates a five-level neutral-point-piloted converter structure 40. The converter structure 40 shown in FIG. 4 employs flying capacitors 42, 44 to provide a flying capacitor (FC) based multi-level converter. Such converter topologies have proven to be advantageous in certain high voltage, high power drive applications, but continue to leave room for improvements in operational efficiency.

FIGS. 5-8 illustrates further classical converter topologies known in the art including a cascaded bridge converter structure 50, a modular multi-level converter structure 60, and active neutral point converter structure 70 and a hybrid converter structure 80. Similar to known NPC and NPP converter structures, these classical converter structures continue to leave room for improvements in operational efficiency and/or waveform quality and/or reliability.

In view of the foregoing, there is a need to provide a high voltage, high power multi-level drive topology that provides further improvements in operational efficiency and/or waveform quality and/or reliability beyond that afforded by known multi-level converter structures.

BRIEF DESCRIPTION

An exemplary embodiment of the disclosure is directed to a high voltage, high power (HVHP) multi-level drive structure. The exemplary HVHP embodiment comprises a plurality of neutral-point-piloted converter cells stacked together and configured with clamping diodes to achieve a zero output voltage level.

Another embodiment is directed to a high voltage, high power (HVHP) multi-level drive structure comprising a plurality of neutral-point-piloted (NPP) converter cells stacked together, and at least one clamping diode connected to each NPP converter cell to provide a neutral-point-pilot-clamped (NPPC) converter structure.

DRAWINGS

The foregoing and other features, aspects and advantages of the invention are apparent from the following detailed description taken in conjunction with the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figures 1, 2:
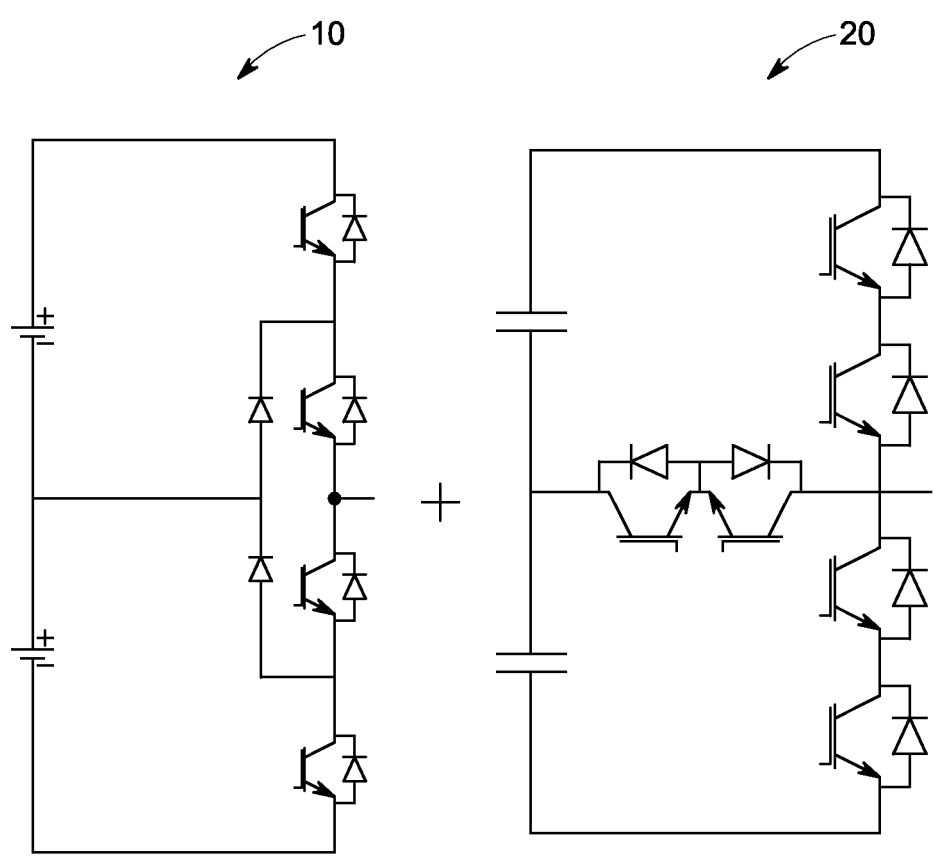
FIG. 1 is a simplified diagram illustrating a 3-level NPC converter structure known in the art.
FIG. 2 is a simplified diagram illustrating another 3-level NPP converter structure known in the art.
Figure 9:
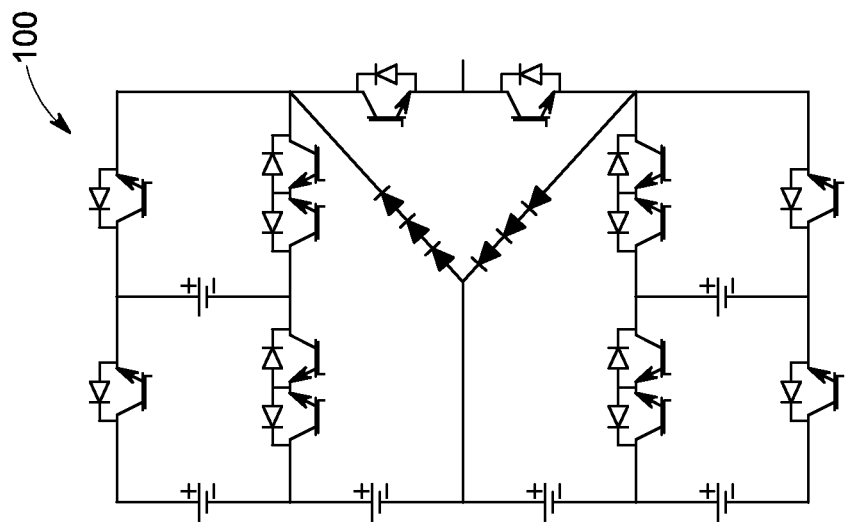
FIG. 9 illustrates a five-level, neutral-point-pilot-clamped converter structure, according to one embodiment.

FIG. 9 illustrates a five-level, neutral-point-pilot-clamped (NPPC) converter structure 90, according to one embodiment. The NPPC converter 90 is particularly useful for multi-phase variable frequency drive applications, among others. NPPC converter 90 can be seen to combine the architectures of classical three-level neutral-point-clamped (NPC) and three-level neutral-point-piloted (NPP) multi-level converter topologies such as those depicted in FIGS. 1 and 2. The present inventors discovered the NPPC converter 90 to have almost 40% reduced semiconductor switching losses and substantially better electrical waveform quality when compared to classical NPC and NPP converters.

According to one aspect, NPPC converter 90 advantageously provides a high voltage output/power by stacking two medium voltage NPP converter cells 92, 94. The NPP converter cells 92, 94 are each clamped with one or more respective diodes 96, 98 to achieve a zero output voltage level by connecting the central node 95 to the output node 93. Output voltage levels +1 and −1 are achieved by using intermediate arms 97, 99. Only two devices are advantageously switched to achieve an output voltage in the range $1<|V0|<2$, resulting in low switching losses.

The high voltage NPPC converter structure 90 uses medium voltage NPP cells 92, 94 resulting in a fewer number of semiconductor devices in each arm 97, 99 when compared to classical high voltage NPP cell structures. Further, high voltage NPPC converter 90 advantageously achieves output voltage levels of +1 and −1 volts, which cannot be achieved with classical NPP structures. Classical high voltage NPP converter cells undesirably requires that four devices be switched to achieve an output voltage in the range 1<|V0|<2, resulting in high switching losses. NPPC converter 90 advantageously require that only two devices be switched to achieve an output voltage in the range 1<|V0|<2, as stated herein.

Figure 3:
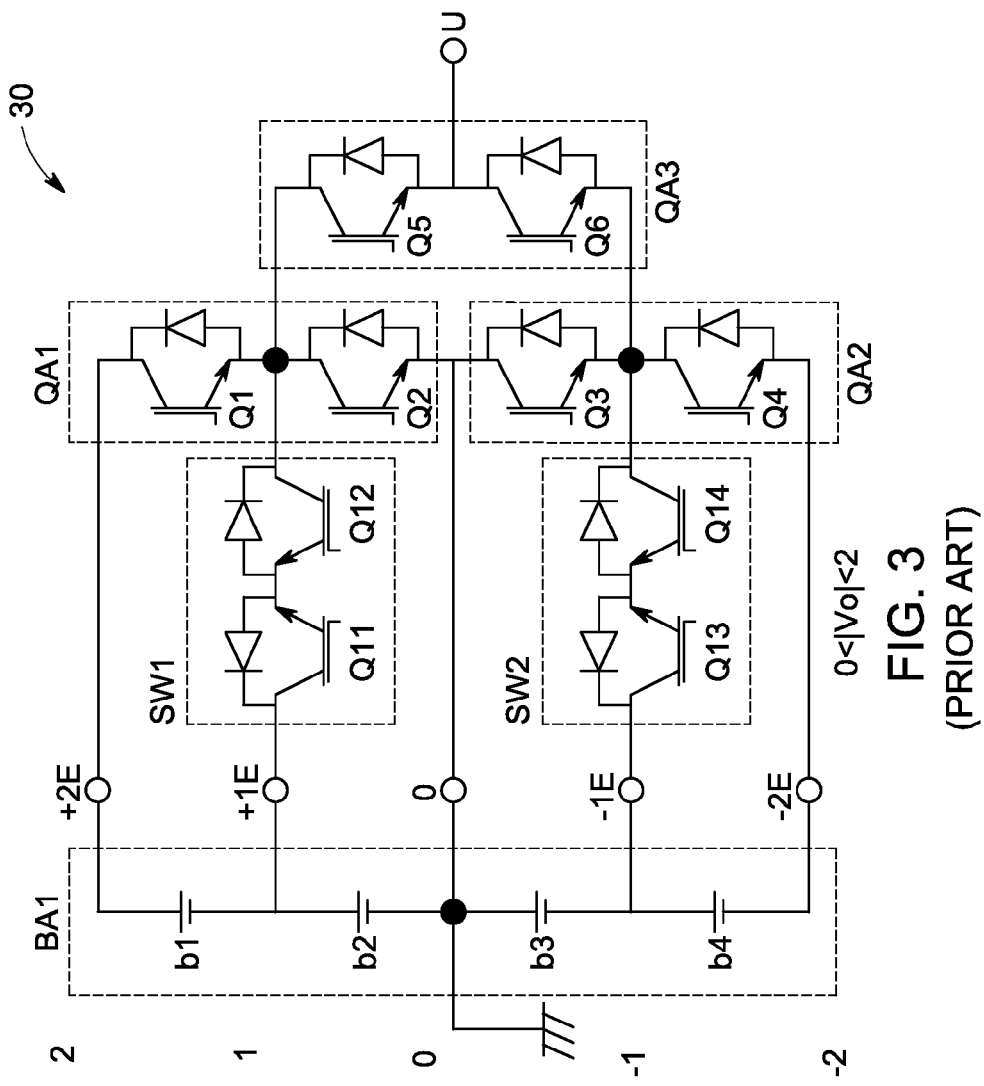
FIG. 3 illustrates a high voltage, high power multi-level converter structure known in the art.

Although the multi-level converter cell structure 30 illustrated in FIG. 3 appears similar to the high voltage NPPC converter structure 90, there are significant differences between the two structures 30, 90. A zero voltage is output to the AC output terminal U of multi-level converter 30 when transistors Q2, Q5 or Q3, Q6 are switched on and Q1, Q4 and SW1, SW2 are switched off, resulting in electric current passing through two semiconductor switches Q2, Q5 or Q3, Q6. In contradistinction, the NPPC converter cell structure 90 achieves a zero output voltage without switching off corresponding semiconductor switches since the switching off of SW1 97 is sufficient. Instead, the clamping diodes 96, 98 automatically conduct, resulting in a zero output voltage at output terminal 93. The NPPC converter cell structure 90 thus results in decreasing losses and increased reliability beyond that achievable with the multi-level converter 30.

Figure 4:
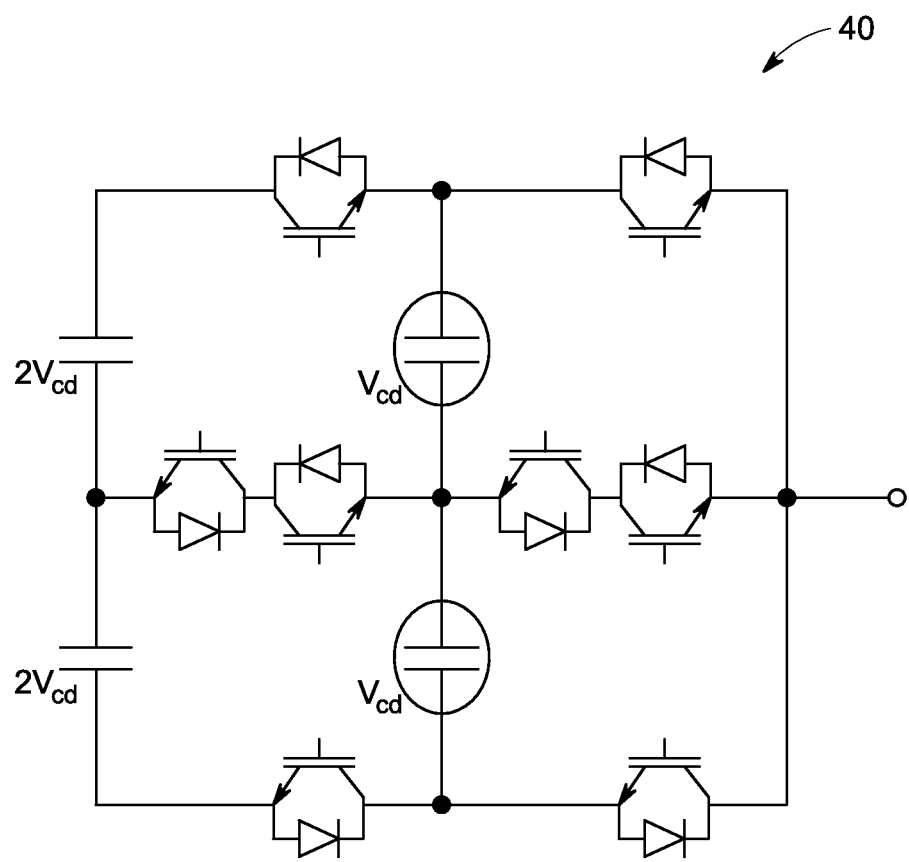
FIG. 4 illustrates another high voltage, high power multi-level converter structure known in the art.
Figure 5:
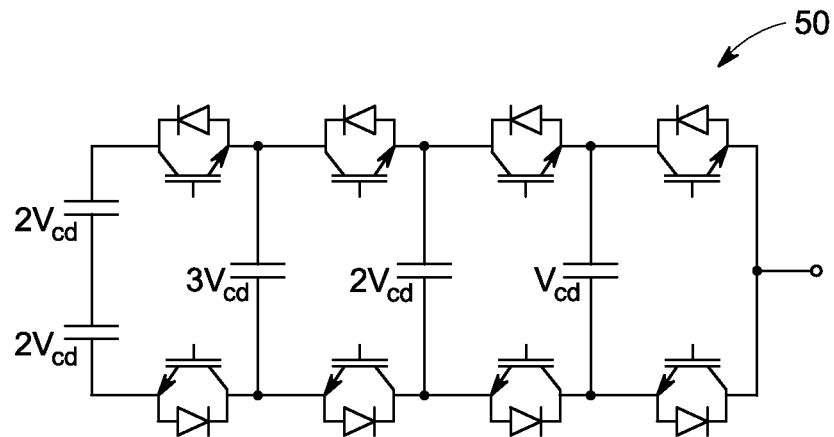
FIG. 5 illustrates is a simplified diagram illustrating a cascaded bridge converter structure known in the art.
Figure 6:
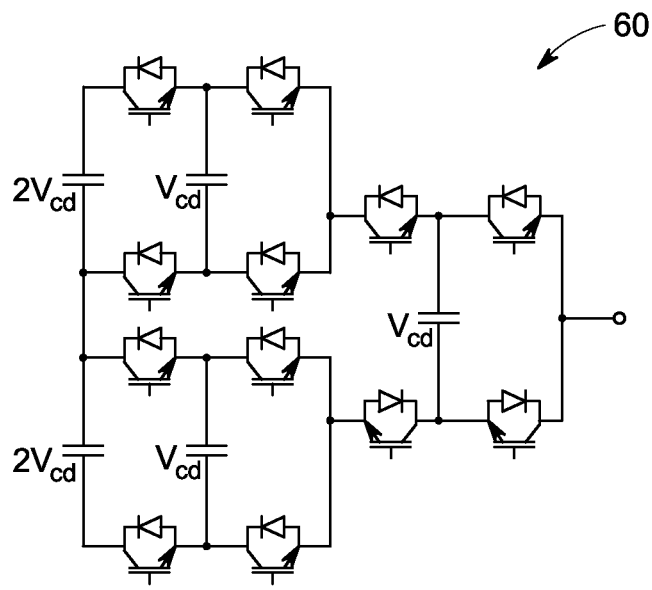
FIG. 6 illustrates a modular multi-level converter structure known in the art.
Figure 7:
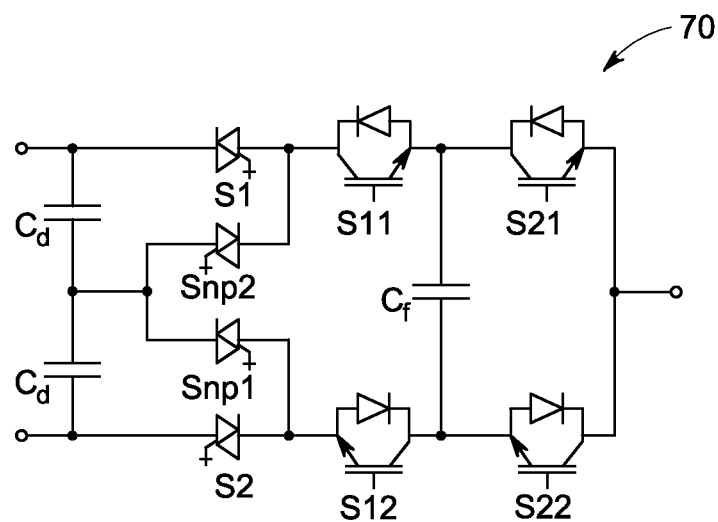
FIG. 7 illustrates an active neutral point converter structure known in the art.
Figure 8:
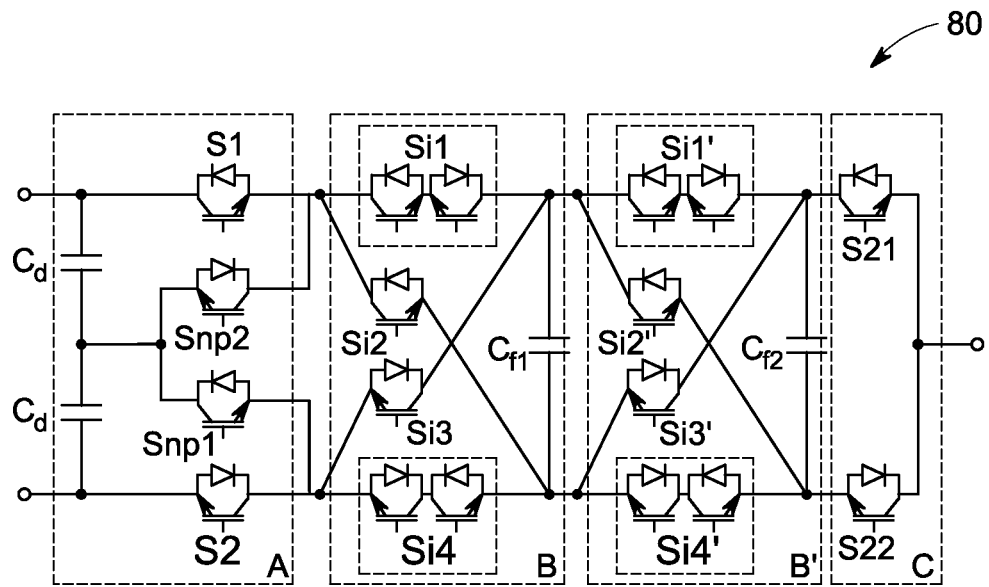
FIG. 8 illustrates a hybrid converter structure known in the art.
Figure 10:
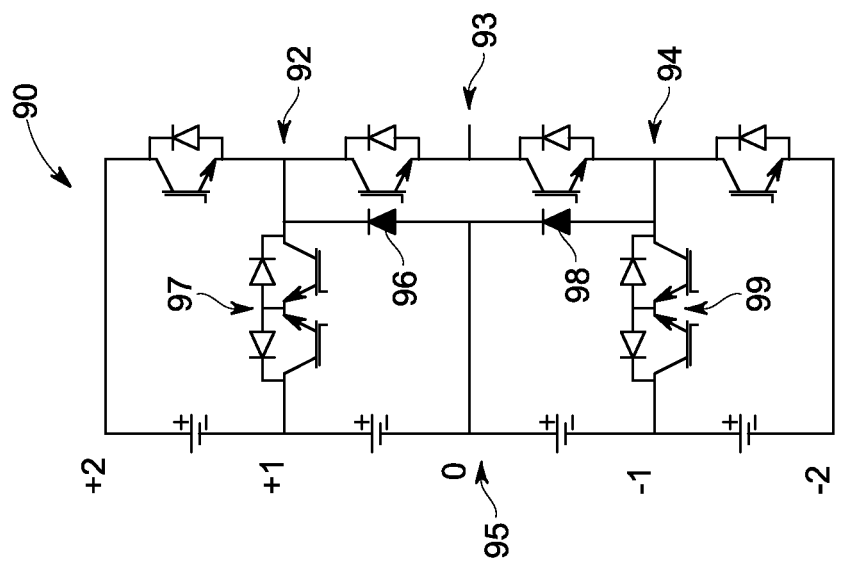
FIG. 10 illustrates a seven-level, neutral-point-clamped-flying-capacitor (NPCFC) converter structure, according to one embodiment.

FIG. 10 illustrates a seven-level, neutral-point-clamped-flying-capacitor (NPCFC) converter structure 100, according to one embodiment. Converter structure 100 combines the NPPC topology shown in FIG. 9 with a flying capacitor (FC) based multi-level converter topology to provide the seven-level NPCFC converter 100. NPCFC converter cell 100 advantageously generates seven levels in the output phase voltage waveform using the same number of flying capacitors as a five-level NPP converter cell such as shown in FIG. 4, resulting in a higher waveform quality, reduced filter requirements and higher efficiency.

Figure 11:
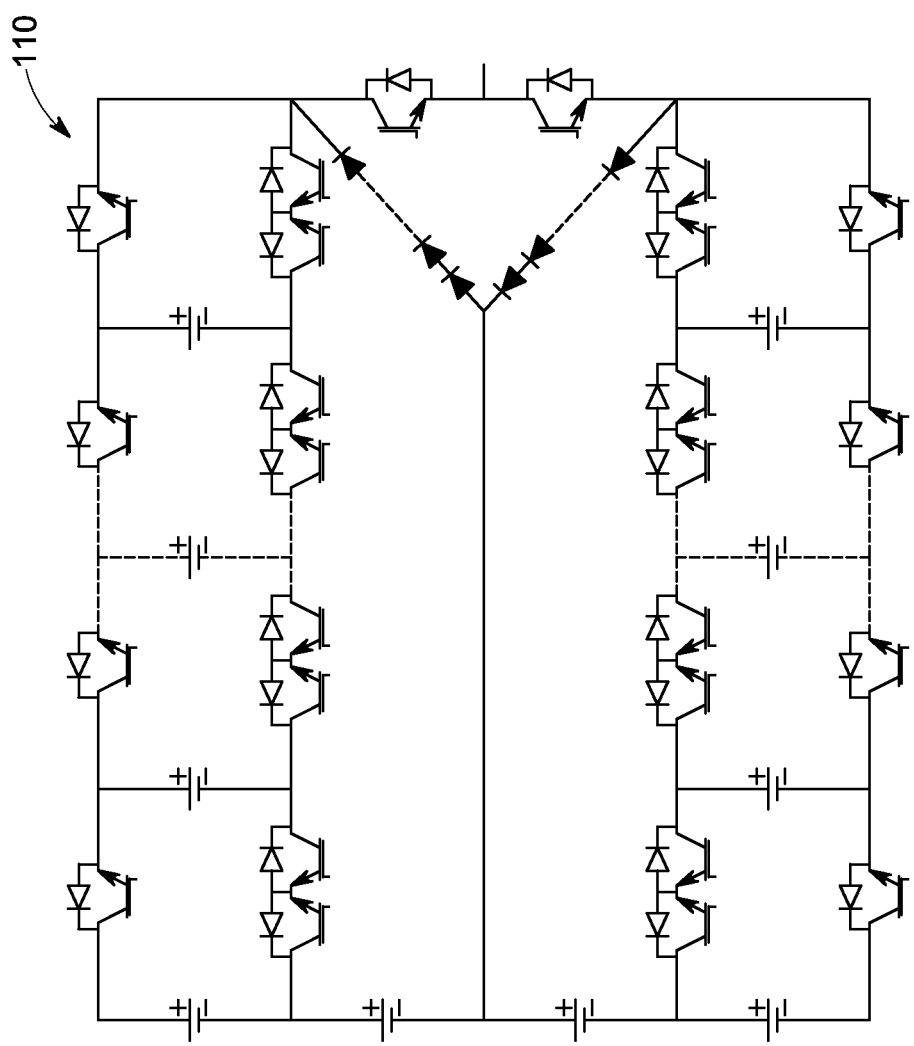
FIG. 11 illustrates an n-level, NPCFC converter structure, according to one embodiment.

FIG. 11 illustrates an n-level, NPCFC converter cell structure 110, according to one embodiment. It can be appreciated that the five-level NPPC converter 90 shown in FIG. 9 is a special case of the n-level, NPCFC converter cell structure 110, without any flying capacitor.

In summary explanation, a high voltage high power (HVHP) multi-level drive topology for multi-phase variable frequency drive, dc/ac, ac/ac, ac/dc or ac/dc/ac power conversion applications is described herein. The HVHP multi-level drive topology combines the architectures of classical neutral-point-clamped and neutral-point-piloted multi-level converter topologies to provide increased operating efficiency and/or higher waveform quality and/or increased reliability. The HVHP multi-level drive topology can be further combined with a flying capacitor based multi-level converter topology to provide a novel n-level neutral-point-clamped-flying-capacitor (NPCFC) converter topology with additional advantages over known multi-level converter cell topologies.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A high voltage, high power (HVHP) multi-level drive with plurality of input and output phases comprising:
 a plurality of neutral-point-piloted (NPP) converter cells stacked together, wherein the plurality of NPP converter cells comprises a first NPP converter cell connected directly to a second NPP converter cell at an output node common to the first and second NPP converter cells, and further wherein the first NPP converter cell comprises a first switching transistor having a first transistor output connected directly to the output node and having a first transistor input connected directly to a first plurality of switching transistors, and further wherein the second NPP converter cell comprises a second switching transistor having a second transistor output connected directly to the output node and having a second transistor input connected directly to a second plurality of switching transistors; and
 a plurality of clamping diodes arranged in series such that a first end of the plurality of clamping diodes is directly connected to the first transistor input and a second end of the plurality of diodes opposite the first end of the plurality of diodes is directly connected to the second transistor input, wherein each of the first and the second transistor inputs are electrically coupled to a common neutral point by at least one corresponding clamping diode selected from the plurality of clamping diodes to provide a multi-level neutral-point-pilot-clamped (NPPC) converter.

2. The HVHP multi-level drive according to claim 1, wherein the plurality of NPP converter cells comprise medium voltage multi-level NPP converter cells.

3. The HVHP multi-level drive according to claim 1, wherein each NPP converter cell comprises a three-level NPP converter cell.

4. The HVHP multi-level drive according to claim 3, wherein the HVHP multi-level drive comprises a five-level NPPC converter.

5. The HVHP multi-level drive according to claim 4, wherein the five-level NPPC converter comprises per-unit output voltage levels consisting of −2V, −IV, OV, +1V and +2V.

6. The HVHP multi-level drive according to claim 1, wherein the multi-level NPPC converter comprises per-unit output voltage levels consisting of −2V, −IV, OV, +1V and +2V.

7. The HVHP multi-level drive according to claim 1, further comprising a plurality of flying capacitors, wherein the multi-level NPPC converter comprises at least one flying capacitor selected from the plurality of flying capacitors, and further wherein the plurality of flying capacitors, the multi-level NPPC converters and the plurality of clamping diodes together provide a neutral-point-clamped-flying-capacitor (NPCFC) converter cell structure.

8. The HVHP multi-level drive according to claim 7, wherein the NPCFC converter cell comprises a seven-level output cell.

9. The HVHP multi-level drive according to claim 7, wherein the NPCFC converter cell comprises an N-level output cell, wherein N is the number of output voltage levels.

10. A high voltage, high power (HVHP) multi-level drive comprising:
 a plurality of neutral-point-piloted (NPP) converter cells stacked together, wherein the plurality of NPP converter cells comprises a first NPP converter cell connected directly to a second NPP converter cell at an output node common to the first and second NPP converter cells, and further wherein the first NPP converter cell comprises a first switching transistor having a first transistor output connected directly to the output node and having a first transistor input connected directly to a first plurality of switching transistors, and further wherein the second NPP converter cell comprises a second switching transistor having a second transistor output connected directly to the output node and having a second transistor input connected directly to a second plurality of switching transistors; and a plurality of clamping diodes arranged in series such that a first end of the plurality of clamping diodes is directly connected to the first transistor input and a second end of the plurality of diodes opposite the first end of the plurality of diodes is directly connected to the second transistor input, wherein each of the first and the second transistor inputs are electrically coupled to a common neutral point by at least one corresponding clamping diode selected from the plurality of clamping diodes to provide a multi-level neutral-point-pilot-clamped (NPPC) converter comprising a zero output voltage level node for the HVHP multi-level drive.

11. The HVHP multi-level drive according to claim 10, wherein the plurality of NPP converter cells comprise medium voltage NPP converter cells.

12. The HVHP multi-level drive according to claim 10, wherein each NPP converter cell comprises a three-level NPP converter cell.

13. The HVHP multi-level drive according to claim 12, wherein the HVHP multi-level drive comprises a five-level NPPC converter.

14. The HVHP multi-level drive according to claim 13, wherein the five-level NPPC converter comprises per-unit output voltage levels consisting of −2V, −IV, OV, +1V and +2V.

15. The HVHP multi-level drive according to claim 10, wherein the multi-level NPPC converter comprises per-unit output voltage levels consisting of −2V, −IV, OV, +1V and +2V.

16. The HVHP multi-level drive according to claim 10, further comprising a plurality of flying capacitors, wherein the multi-level NPPC converter comprises at least one flying capacitor selected from the plurality of flying capacitors, and further wherein the plurality of flying capacitors, the plurality of multi-level NPPC converters and the plurality of clamping diodes together provide a neutral-point-clamped-flying-capacitor (NPCFC) converter cell structure.

17. The HVHP multi-level drive according to claim 16, wherein the NPCFC converter cell comprises a seven-level output cell.

18. The HVHP multi-level drive according to claim 16, wherein the NPCFC converter cell comprises an N-level output cell, wherein N is the number of output voltage levels in one output phase.

* * * * *